Patented Nov. 3, 1942

2,300,627

UNITED STATES PATENT OFFICE 2,300,627

METHOD OF PREPARING STORAGE BATTERY PLATES

David A. Merson, Brooklyn, N. Y., assignor to National Lead Company, New York, N. Y., a corporation of New Jersey No Drawing. Application October 19, 1940, Serial No. 361,912

12 Claims. (Cl. 136—33)

The present invention relates to a method for the preparation of storage battery plates, and has particular reference to the pasting of negative and positive plates of lead-acid type batteries and the subsequent processing of such plates, following the pasting thereof, economically and conveniently without danger of the plates cracking or checking when subjected to the mechanical abuse encountered in modern storage battery production.

In the early art of drying plates for batteries of the lead-acid type, the principal problem was that of obtaining plates which would be strong and at the same time free from checks or cracks. This problem was solved over a considerable period of years by finally developing the well known large, complicated and space-consuming ovens, drying rooms, chambers, or tunnels which at the present time occupy a considerable part of the average battery plant. A good plate free from cracks was thereby produced only at considerable cost in fuel and space upkeep to operate these ovens. In a large plant the plates were of necessity moved over a considerable distance by mechanical power.

Previously also the surfaces of battery plates pasted according to known methods have been treated before drying by one or several chemical agents. The earlier methods involved dipping the plate after pasting in a dilute solution of sulfuric acid, thereby producing a surface bond of lead sulfate on each side of the plate. The plates would then be dried in an oven having controls for effecting and maintaining the necessary conditions of the temperature and humidity to insure drying without cracking or checking.

Still other methods were devised involving the production of a lead carbonate film over the surface of the freshly pasted plates, the function of which carbonate film was substantially the same as that of the lead sulfate film. The agents employed in the production of the lead carbonate film have been solutions of alkali carbonate, specifically ammonium carbonate, or carbon dioxide gas, resulting from the combustion of natural or artificial illuminating gas. The plates were then dried in an oven under controlled conditions of temperature and humidity. Said methods necessarily produced a film on the surface of the plates of a substance physically or chemically different from the main body of the plate which may produce surface forming difficulties.

Among the objects of the present invention is the providing of a method for pasting storage battery plates and subsequently drying the same in an inexpensive and convenient manner without the employing of any elaborate drying ovens or any other apparatus previously necessary to attain the proper temperature and humidity conditions required to effect the drying of storage battery plates without their cracking or checking.

A further object of the invention is to provide preliminarily to the drying proper of the pasted plates according to this invention, a method for processing the surfaces of freshly pasted storage battery plates without substantially altering the chemical composition of the surfaces or the physical or chemical character of the underlying paste and without the use of any chemical reagents, e. g., either gaseous mediums such as carbon dioxide or liquid medium comprising solutions of various salts.

Still a further object of the present invention is to provide a method for drying freshly pasted storage battery plates without the employment of any external heat whatsoever.

These and further objects of my invention will become more apparent from the detailed description thereof hereinafter to follow.

According to the practice of my invention, I have now found that if storage battery plates are pasted with a paste comprising litharge-metal mixtures wherein the metal content is broadly between about 5 per cent and about 55 per cent, but preferably between about 20 per cent to about 50 per cent of the total mixture, the plates may be dried by simply storing the same when wet in a room having access to air without employing any heating ovens or controls to maintain the proper conditions of humidity and temperature. The drying is accomplished by the action of the air and the occluded water in the paste resulting in an oxidation of the metallic content of the litharge to lead oxide or lead hydroxide within the plates. This oxidation is accompanied by an exothermic heat reaction which at times will cause the plates to reach a temperature as high as 140° F. The actual time for drying the plates will depend on the thickness of the plates. Thus, a plate having a thickness of .080 inch will usually take a period of from 24 to 48 hours while a thicker plate, for example, of .250 inch thickness will require from about 48 hours to about 72 hours to dry. Thus, the time required for drying will usually increase in proportion to the thickness of the plates. This slow drying by exothermic heat over a period of 24 hours or more results in a gradual structural change in the plates which contributes to desirable capacity an long-life characteristics when the plates are incorporated into storage batteries.

It is, of course, desirable in order to utilize the exothermic heat to dry the plates according to this invention to stack the same one on top of the other, or if the surfaces of the plate are not sufficiently dry so as to prevent their sticking together, to rack the plates by their lugs or stack them a small distance apart, ranging from an infinitesimal small distance to not more than ½ of an inch apart. In this latter case where the plates are not stored in contacting relationship to one another, it is desirable to cover with a tarpaulin or other suitable moisture-retaining covering which may be wet, the plates during the initial drying thereof in order to insure that the necessary exothermic reactions will begin to take place without cracking the plates.

By way of illustrating this phase of my invention the following specific example may be given from which, however, no undue limitations should be deduced. Thus, it should be remembered, as above pointed out, that if plates are prepared thicker than those set forth in the example a proportionately longer period of time will be required to effect the drying thereof according to this invention.

*Example I*

A paste for a negative plate was prepared by mixing 100 pounds of a litharge-finely divided metal mixture wherein the metallic lead content was 23 per cent of the total mixture, with about 2 pounds of a suitable expander material and then mixing this mass with 5000 cc. of water until it became plastic. Then 3000 cc. of $H_2SO_4$ of a specific gravity of approximately 1.250 was added and the mixing continued until the desired reaction was complete. The plastic litharge-lead sulfate-metallic lead mixture was then pasted into the grids so as to form plates having a thickness of approximately .080 inch. Since the surfaces of the plates prepared by this example were not surface treated, they were racked a small space apart from one another, so as to prevent their sticking together. The freshly pasted plates were then covered with a tarpaulin and stored in a room accessible to air, the temperature of this room being 78° F. The plates were allowed to stand for a period of 24 hours during which they began to dry by virtue of the exothermic heat resulting from the oxidation of the metallic content of the paste. It was observed that after standing for a period of 24 hours at which time the tarpaulin was removed, the plates had heated up because of the exothermic oxidation reaction to a temperature of 110° F. At this time the metallic content of the plates had dropped from 23 per cent to 12 per cent and the moisture content had dropped to 8.7 per cent as compared with the original moisture content of 11.2 per cent. During the subsequent 24 hours the plates now uncovered continued to react and reached a temperature of 118° F. After 48 hours it was noted that the metallic lead content had further dropped to 4.7 per cent and the moisture content to 5.6 per cent. These plates were then formed in the known manner after which they are ready for the usual assembly into batteries according to known methods.

A positive plate may be prepared in the same manner as the negative plate of the above example, except, however, that in the case of the positive plate it is preferable to leave out the expander. Moreover, an amount of red lead ranging from 5 to 50 per cent by weight of the litharge-metal mixture may be incorporated into the mix preferably before the addition of water. After pasting into grids, the positive plates are dried in the same manner as the negative plates.

It is to be observed from the above example that my invention makes it possible to dry storage battery plates without the application of any external heat whatsoever, thus obviating the need for employing heating ovens having elaborate controls for obtaining the proper conditions of temperature and humidity in order to effect the satisfactory drying of the plates.

*Example II*

A suitable paste for negative or positive battery plates was prepared according to the manner of Example I from a litharge containing 30 per cent of finely divided metallic lead and then pasted into the grids. The surfaces of the pasted plates which plates were approximately .080 inch thick, were then subjected to an intense electrical heat of 400° F. for a period of one minute. The plates were then stacked one upon the other in a room accessible to air and allowed to stand for a period of 48 hours during which time the underlying pasty portions of the plates were dried by reason of the exothermic heat resulting from the oxidation of the metallic lead content of the pasted plates.

It will, of course, be understood that where the plates are stacked one on top of the other in the manner of the above example, the vapor given off during the exothermic reaction taking place in the plates, will have ample opportunity to escape to the air not only from around the sides of the plates, but also from the top and bottom of the pile of stacked plates and from between the surfaces of the stacked plates, since no perfect contact between the plates is formed. Also, as the vapor escapes from the top of the pile of stacked plates, more vapor is brought to the top surface by capillary action and there escapes to the air.

Where it is desired to stack the freshly pasted plates on top of one another, as in the above Example II, the surfaces of the plates will have to be treated in order to prevent their sticking together. This may be accomplished by any of the means already known to the art. Thus, the plates may be pickled in a sulfuric acid or ammonium persulfate solution or may be treated with carbon dioxide. Such methods involve the formation of a film of material over the surfaces of the freshly pasted plates which is foreign to the composition of the plates.

While such means for surface treatment may be employed prior to the curing and drying of the interior of the plates according to my invention, I prefer to employ a novel method of surface drying. This novel method of surface drying contemplated by my invention involves as set forth in Example II, the application of heat to the surfaces of freshly pasted storage battery plates in such a way as to dry the surfaces without substantially altering the chemical composition of the surfaces or the physical or chemical character of the underlying paste. It is to be observed that the surface drying of the plates according to this invention does not involve the use of any chemical reagents such as gaseous mediums, e. g., carbon dioxide, or liquid mediums, such as solutions of various salts.

The application of heat to the surface of the freshly pasted plates may be accomplished in several ways which are more particularly described in my copending application, Serial No. 361,913 filed October 19, 1940, U. S. Patent No. 2,300,628 dated Nov. 3, 1942.

Thus, heat may be supplied by electric hot plates or strip heaters located in sufficiently close proximity to each side of the newly pasted plates to dry the surfaces thereof. These heated metal plates may be part of a separate drying unit. However, the principle of my invention may be carried out by merely supplying heat to the scrapers or wipers of a pasting machine which supply the final wiping actions over the surfaces of the plates, thus enabling great savings to be made in manufacturing costs and in the space required for drying plates in the present practice of the art.

Another variation of my invention includes the use of heated rolls which can be used to treat the surface at the same time that a distinctive surface design is imprinted upon the soft paste. As the plates are conveyed by a chain or belt between the opposing heating elements, a rapid heating of the surfaces takes place following which the plates are removed from the other end of the chain or belt by any of the conventional methods now employed and either placed in racks or stacked on a platform.

Still another variation of my invention contemplates the use of heated belts to convey the plates after pasting so that the surfaces of the plates are quickly dried by means of such a combined conveyor and heated element.

While the methods of drying enumerated above employing the use of electric heating are desirable, I do not wish to limit the scope of my invention to such a type of heating. For example, I may choose to heat by means of externally applied steam, flames of gas or oil or other combustible matter or any other known method of heating. In employing flames of gas or oil, however, it is to be borne in mind that such flames should not impinge upon or be placed too closely to the surfaces of the newly pasted plates as this may cause a chemical reaction to take place on the surface of the plates resulting in the formation of a film on the surface of the plates of a substance physically or chemically different from the main body of the plate which may produce surface forming difficulties.

In carrying out the surface drying of the storage battery plates by the application of heat in any of the above ways, the newly pasted plates are subjected to an intense heat the temperature of which, however, should be below that at which any part of the plate will melt or catch fire, for a period of time ranging from about one second to about sixty seconds so as to dry only the surfaces of the plates without causing any changes in the portions of the plates immediately underlying the surfaces thereof, which portions may be considered to be still in a pasty condition. While I prefer to use an intense heat in order to accelerate the surface drying, a more moderate heat, e. g., from 200° F. to 250° F., may be employed over a more extended period of time ranging, for example, from about one minute to thirty minutes.

In cases where it is not feasible or possible to employ any heat but where it is desired to dry the surfaces of the newly pasted plates so as to enable them to be stacked or racked closely together in a contacting manner without sticking together, my invention contemplates the removal of moisture from the surfaces of the plates by mechanical means, e. g., by pressing, squeezing or rolling the plates or by intimately contacting the surfaces thereof with an absorptive material.

Thus, where it is desired to paste the plates by hand employing an absorptive material to remove surface moisture, the procedure of the following example may be used:

Example III

A suitable paste for negative or positive battery plates was prepared according to the manner of Example I from a litharge-finely divided metallic lead mixture in which the metallic lead content was 30 per cent of the total mixture. A grid was placed on a sheet of absorbent paper on a smooth hard surface and the paste pressed into the grid structure. Another piece of absorbent paper was then placed over the upper side of the pasted grid, and pressed into firm contact with the paste. The plate was then turned over, the adhering bottom strip being removed and discarded. Additional paste was pressed into this exposed surface of the grid and a fresh piece of paper pressed into intimate contact with the pasted grid. Additional grids were now pasted in exactly similar fashion and placed one on top of the other with the absorbent paper intervening between each pasted grid or plate which was .080 inch thick. After 8 hours the intervening absorbent papers were stripped off and the plates with the surfaces now sufficiently dried to enable them to be stacked one on top of the other were allowed to stand for an additional period of 40 hours during which time the plates were interiorly dried by reason of the exothermic heat resulting from the oxidation of the metallic portion of the paste employed.

It will be noted from the above example that in order to guard against any possibility of the plates sticking together they were first stacked with absorbent papers between their respective surfaces.

Example IV

My invention also contemplates the preparation of a storage battery paste of such consistency that the pasted plates are sufficiently dry after pasting so that the plates will not stick together when suspended closely together by their lugs or stacked one on top of the other. Paste of the desired consistency may be prepared by increasing the amount of acid used. Thus, instead of employing the ordinary proportions of 1 part of acid of 1.4 specific gravity to 13 parts of litharge containing metallic lead, I may employ 1½ parts of acid of the same concentration to 13 parts of litharge containing metallic lead. The desired consistency of the paste may also be obtained by decreasing the amount of water used. Thus, I may use 0.7 part instead of 1 part of water to 9 parts of litharge-metallic lead content of the paste.

The foregoing description and examples of my invention have been given merely for purposes of illustration, and no undue limitations should be deduced therefrom. It is obvious that variations within the skill of the art may be made without departing from the spirit of the invention.

I claim:

1. A method for preparing storage battery plates which comprises pasting the plates with a paste comprising a litharge finely divided metallic lead mixture, storing closely together said freshly pasted plates and allowing the same to dry in the presence of air, the amount of metallic lead in the paste being sufficient to effect such drying by reason of the exothermic heat resulting from the oxidation of said metallic lead content of the paste.

2. A method for preparing storage battery plates which comprises pasting the plates with a paste comprising a litharge-finely divided metallic lead mixture, storing said freshly pasted plates when interiorly wet in close proximity to one another and allowing the same to dry in the presence of air, the amount of metallic lead in the paste being sufficient to effect such drying by reason of the exothermic heat resulting from the oxidation of said metallic lead content of the paste.

3. A method for preparing storage battery plates which comprises pasting the plates with a paste comprising a litharge-finely divided metallic lead mixture wherein the metallic lead content is between about 5 per cent and about 55 per cent of the total mixture, storing in close proximity to one another said freshly pasted plates when interiorly wet and allowing the same to dry in the presence of air by reason of the exothermic heat resulting from the oxidation of the metallic lead content of the paste.

4. A method for preparing storage battery plates which comprises pasting the plates with a paste comprising a litharge finely divided metallic lead mixture wherein the metallic lead content is between about 20 per cent and 50 per cent of the total mixture, storing not more than a one-half inch apart said freshly pasted plates when interiorly wet, under ordinary room conditions of temperature and humidity, and allowing said plates to dry in the presence of air by reason of the exothermic heat resulting from the oxidation of the metallic lead content of the paste for a period of from 24 to about 72 hours, during the initial period of which drying the plates are covered.

5. A method for preparing storage battery plates which comprises pasting the plates with a paste comprising a litharge-finely divided metallic lead mixture, removing sufficient moisture from the surfaces of said freshly pasted plates to enable them to be stacked one on top of the other, and allowing them to dry in the presence of air, the amount of metallic lead in the paste being sufficient to effect such drying by reason of the exothermic heat resulting from the oxidation of said metallic lead content of the paste.

6. A method for preparing storage battery plates which comprises pasting the plates with a paste comprising a litharge-finely divided metallic lead mixture, drying the surfaces of said freshly pasted plates, stacking the same one on top of the other in the presence of air, and allowing said plates to dry interiorly, the amount of metallic lead in the paste being sufficient to effect such drying by reason of the exothermic heat resulting from the oxidation of said metallic lead content of the paste.

7. A method for preparing storage battery plates which comprises pasting the plates with a paste comprising a litharge-finely divided metallic lead mixture, heating the surfaces of said freshly pasted plates to effect the drying thereof, storing said plates in contacting relationship to one another, and allowing them interiorly to dry in the presence of air, the amount of metallic lead in the paste being sufficient to effect such drying by reason of the exothermic heat resulting from the oxidation of said metallic lead content of the paste.

8. A method for preparing storage battery plates which comprises pasting the plates with a paste comprising a litharge-finely divided metallic lead mixture, subjecting the surfaces of said freshly pasted plates to sufficient heat to effect the surface drying thereof without the formation of any substance foreign to the composition of the plates, stacking said plates one on top of the other under ordinary room conditions of temperature and humidity, and allowing them to dry, the amount of metallic lead in the paste being sufficient to effect such drying by reason of the exothermic heat resulting from the oxidation of said metallic lead content of the paste.

9. A method for preparing storage battery plates which comprises pasting the plates with a paste of relatively dry consistency comprising a litharge-finely divided metallic lead mixture, storing said plates in contacting relationship to one another under ordinary room conditions of temperature and humidity and allowing them to dry, the amount of metallic lead in the paste being sufficient to effect such drying by reason of the exothermic heat resulting from the oxidation of said metallic lead content of the paste.

10. A method for preparing storage battery plates which comprises pasting the plates with a paste comprising a litharge-finely divided metallic lead mixture, removing moisture from the surfaces of said freshly pasted plates by the application thereto of absorptive material, stacking said plates one on top of the other under ordinary room conditions of temperature and humidity and allowing the same to dry, the amount of metallic lead in the paste being sufficient to effect such drying by reason of the exothermic heat resulting from the oxidation of said metallic lead content of the paste.

11. A method for preparing negative storage battery plates which comprises pasting the plates with a paste comprising a litharge-finely divided metallic lead mixture and an expander, storing said freshly pasted plates when interiorly wet in close proximity to one another and allowing the same to dry in the presence of air, the amount of metallic lead in the paste being sufficient to effect such drying by reason of the exothermic heat resulting from the oxidation of said metallic lead content of the paste.

12. A method for preparing positive storage battery plates which comprises pasting the plates with a paste comprising a litharge-finely divided metallic lead mixture and red lead, storing said freshly pasted plates when interiorly wet in close proximity to one another and allowing the same to dry in the presence of air, the amount of metallic lead in the paste being sufficient to effect such drying by reason of the exothermic heat resulting from the oxidation of said metallic lead content of the paste.

DAVID A. MERSON.